United States Patent
Lambert (10) Patent No.: US 9,575,324 B2
(45) Date of Patent: Feb. 21, 2017

(54) BEAM GUIDING APPARATUS

(71) Applicant: TRUMPF Lasersystems for Semiconductor Manufacturing GmbH, Ditzingen (DE)

(72) Inventor: Martin Lambert, Korb (DE)

(73) Assignee: TRUMPF Lasersystems for Semiconductor Manufacturing GmbH, Ditzingen (DE)

( * ) Notice: Subject to any disclaimer, the term of this patent is extended or adjusted under 35 U.S.C. 154(b) by 0 days.

(21) Appl. No.: 15/068,088

(22) Filed: Mar. 11, 2016

(65) Prior Publication Data

US 2016/0195729 A1 Jul. 7, 2016

Related U.S. Application Data

(63) Continuation of application No. PCT/EP2013/068952, filed on Sep. 12, 2013.

(51) Int. Cl.
*H05G 2/00* (2006.01)
*G02B 27/09* (2006.01)
(Continued)

(52) U.S. Cl.
CPC ....... *G02B 27/0927* (2013.01); *G02B 27/0977* (2013.01); *G02B 27/1006* (2013.01);
(Continued)

(58) Field of Classification Search
CPC .......... H05G 2/00; H05G 2/001; H05G 2/003; H05G 2/005; H05G 2/006; H05G 2/008; G02B 27/0927; G02B 27/0977; G02B 27/1006; G02B 27/143; G21K 1/06
See application file for complete search history.

(56) References Cited

U.S. PATENT DOCUMENTS 8,598,552 B1 * 12/2013 Frihauf ................. H05G 2/005
                                                            250/504 R
8,680,495 B1 * 3/2014 Tao ........................ H05G 2/005
                                                            250/493.1

(Continued)

FOREIGN PATENT DOCUMENTS

EP          2182412 A1     5/2010
WO     WO2011162903 A1    12/2011
WO     WO2012073086 A1     6/2012

OTHER PUBLICATIONS

International Search Report from corresponding PCT Application No. PCT/EP2013/068952, mailed May 27, 2014, 4 pages.

(Continued)

*Primary Examiner* — David E Smith
(74) *Attorney, Agent, or Firm* — Fish & Richardson P.C.

(57) ABSTRACT

In one implementation, a beam guiding apparatus includes a vacuum chamber that includes a target region arranged to receive a target material for generating EUV radiation. The vacuum chamber further includes a first opening for receiving into the vacuum chamber a first laser beam and a second opening for receiving into the vacuum chamber a second laser beam. The vacuum chamber also includes a superposition apparatus arranged to superpose the first laser beam having a first wavelength and a second laser beam having a second wavelength for common beam guidance in the direction of the target region. The vacuum chamber also includes a beam shaping apparatus arranged upstream of the superposition apparatus in the beam path of the second laser beam, wherein the beam shaping apparatus is configured to set a ring-shaped beam profile of the second laser beam, The first and second laser beam have different wavelengths.

20 Claims, 3 Drawing Sheets

(51) Int. Cl.
G02B 27/10 (2006.01)
G02B 27/14 (2006.01)
G21K 1/06 (2006.01)

(52) U.S. Cl.
CPC ............. G02B 27/143 (2013.01); G21K 1/06 (2013.01); H05G 2/008 (2013.01)

(56) References Cited

U.S. PATENT DOCUMENTS

| | | | |
|---|---|---|---|
| 2011/0101863 A1* | 5/2011 | Komori | G03F 7/70033 315/111.41 |
| 2011/0140008 A1 | 6/2011 | Bergstedt et al. | |
| 2011/0309260 A1* | 12/2011 | Nishisaka | G03B 27/54 250/372 |
| 2013/0015319 A1* | 1/2013 | Moriya | G03F 7/70008 250/201.1 |
| 2013/0026393 A1 | 1/2013 | Abe et al. | |
| 2013/0126751 A1* | 5/2013 | Mizoguchi | G02B 5/001 250/453.11 |
| 2013/0153794 A1* | 6/2013 | Wakabayashi | H05G 2/008 250/504 R |

OTHER PUBLICATIONS

Notification of Transmittal of Translation of the International Preliminary report on Patentability and the Written Opinion of the International Search Authority for corresponding PCT Application No. PCT/EP2013/068952, issued Mar. 15, 2016, 15 pages.

* cited by examiner

BEAM GUIDING APPARATUS

CROSS-REFERENCE TO RELATED APPLICATION

This application is a continuation of and claims priority under 35 U.S.C. §120 to PCT Application No. PCT/EP2013/068952 filed on Sep. 12, 2013. The contents of this priority application is hereby incorporated by reference in its entirety.

TECHNICAL FIELD

The present disclosure relates to a beam guiding apparatus.

BACKGROUND

A beam guiding apparatus for an extreme ultraviolet radiation (EUV) generating device has been disclosed in, for example, US 2011/0140008 A1. The beam guiding apparatus described therein serves for guiding laser radiation which was generated and amplified in a beam source, for example, a driver laser system. The beam guiding apparatus guides the laser beam from the driver laser system to a focusing apparatus in order to focus the laser beam in a target region. A target material which is converted into a plasma state when irradiated by the laser beam and which emits EUV radiation in the process is provided in the target region. The target material is typically provided in a vacuum chamber, into which the laser beam enters by way of an opening.

In general, some of the target materials (e.g. tin) evaporate when irradiated by the laser beam and deposit on the optical surfaces of optical elements arranged in the vicinity of the target region. In order to counteract this problem, a $CO_2$ laser is generally used as a laser source or as a driver laser. As a result of the long wavelength (for example, approximately 10.6 µm), $CO_2$ laser radiation is also reflected by optical elements that have a comparatively rough optical surface caused by, e.g., tin deposits. The use of a laser source or a driver laser in the form of a $CO_2$ laser can lead to high conversion efficiency between the input power of the driver laser and the output power of the generated EUV radiation in the case of specific target materials such as, e.g., tin.

WO 2011/162903 discloses a driver laser arrangement that has a first seed laser for generating a pre-pulse and a second seed laser for generating a main pulse. The pre-pulse and the main pulse have different wavelengths and they are combined by a beam combiner in order to pass along a common beam path through an amplifier and the beam guiding apparatus following the driver laser arrangement. The pre-pulse can, for example, influence the target material. For example, the pre-pulse can heat up, expand, vaporize, and/or ionize the target material to generate a weak, or possibly a strong, plasma. The main pulse can, for example, convert the majority of the material influenced by the pre-pulse into the plasma state and generate EUV radiation in the process.

Both the pre-pulse and the main pulse are guided into the vacuum chamber through the same opening. Since the pressure inside the vacuum chamber is typically lower than the pressure in the beam guidance outside of the vacuum chamber, it is generally required to seal the opening in the vacuum chamber in a gas-tight manner from the surroundings by a transmissive optical element which, for example, may form a window, e.g., a plane plate. The transmissive optical element should enable a passage for both laser beams (pre-pulse and main pulse) with small losses and/or aberrations. However, if the wavelength of the pre-pulse differs significantly from the wavelength of the main pulse, the transmissive optical element can lead to losses and aberration in pre-pulse or main pulse or both.

SUMMARY

The present disclosure covers a beam guiding apparatus and a EUV radiation generating device for providing common focusing of laser beams with different wavelengths in a target region.

In one implementation, a beam guiding apparatus includes a vacuum chamber that includes a target region arranged to receive a target material for generating EUV radiation. The vacuum chamber further includes a first opening for receiving into the vacuum chamber a first laser beam and a second opening for receiving into the vacuum chamber a second laser beam. The vacuum chamber also includes a superposition apparatus arranged to superpose the first laser beam having a first wavelength and a second laser beam having a second wavelength for common beam guidance in the direction of the target region. The first laser beam and the second laser beam have different wavelengths. In some implementations, the first and second laser beams do not enter into the vacuum chamber through a common opening or a common window but rather use two different openings in order to be able to use a transmissive material, optimized for the respective wavelength, for the transmissive optical element sealing the respective opening. Separate beam paths of the two laser beams emerge in the vacuum chamber as a result of the two different openings.

For the purposes of combining the two beam paths, the superposition apparatus is proposed, in which the superposition apparatus combines and superposes the two laser beams entering through the different openings in such a way that these are incident together on optical elements arranged downstream of the superposition apparatus. Within the meaning of this application, superposition is understood to mean that the beam axes of the two laser beams are superposed, e.g., the two laser beams have a common beam axis after the superposition. The laser beams themselves propagate coaxially along the common beam axis, e.g., the radiation from the first laser beam has a typically substantially circular beam cross section, which is surrounded by the substantially ring-shaped beam cross section of the second laser beam.

By contrast, a consequence of the separate beam guidance of the two laser beams would be that dynamic excitations caused by vibrations, thermally induced displacements of a respective optical element, among other factors, would have different effects on the laser beams, which would lead to different beam paths or different fluctuations in the lengths of the beam paths of the two laser beams in relation to the respective focal position and hence to a change in the relative distance between the two focal positions of the two laser beams in the target region along a movement direction or a movement path of the target material and/or the tin droplets. However, the relative distance between the two focal positions should be maintained precisely; this can be ensured by the common beam guidance of the two laser beams, in particular, when these are focused or pass through the focusing apparatus, since the errors in the beam guidance have the same effect on the laser beams that are guided together.

The foregoing and other implementations can optionally include one or more of the following features, individually or in combination. For example, in some implementations, the superposition apparatus includes a reflecting optical element, arranged in the vacuum chamber. The reflecting optical element includes a first surface region for reflecting the first laser beam and a second surface region, surrounding the first surface region in a ring-shaped manner, for reflecting the second laser beam. With the aid of the above-described superposition apparatus, it is possible to combine two laser beams, which are incident on the reflecting optical element from different directions or at different angles of incidence, without needing to use a transmissive optical element for this purpose, as is the case in a conventional superposition apparatus, in which a partly transmissive mirror made of a material transparent to at least one laser beam or one wavelength as well as a coating are used, which, depending on the wavelength, can be complicated in terms of the production thereof and very sensitive to contamination.

In some implementations, the reflecting optical element is a mirror with a circular geometry, e.g., the inner surface region forms a circular area arranged concentrically in relation to the geometric center of the mirror while the outer surface region forms an outer, concentric ring surface. The first laser beam is then deflected by the inner surface region and the second laser beam is deflected by the outer surface region. In this case, the reflecting optical element is aligned in such a way in relation to the beam directions of the two incident laser beams that these beams, after the reflection or deflection, propagate along a common beam direction. In some implementations, the first surface region and the second surface region can be embodied as planar surfaces which are tilted in relation to one another. The first and the second surface region can each be provided with a coating that reflects the wavelength of the laser beam to be reflected, e.g., with a coating which increases the reflectivity of the surface region for the respective wavelength. The surface regions themselves are typically formed on the surface of a metallic material which was generally subjected to surface treatment.

In some implementations, the reflecting optical element is configured to expand the first and second laser beams. In this case, the reflecting optical element also allows for beam expansion, e.g., for generating divergent laser beams and/or for increasing the divergence of the laser beams, in addition to the superposition of the two laser beams. To this end, the two surface regions typically have a convex curvature. The beam expansion of the laser beams is advantageous, in particular in combination with a subsequent optical element which focuses the divergent laser beams in the target region.

In some implementations, the first surface region includes a convexly curved paraboloid surface. The paraboloid surface is typically a reflecting surface which forms an off-axis segment of a paraboloid. The term "off axis" means that the first surface region does not contain the axis of rotation or the principal axis of the paraboloid (and hence it does not contain the vertex of the paraboloid either). Typically, the beam direction of the laser beam incident on the first surface region extends parallel to the principal axis of the paraboloid. This allows aberration-free imaging to be realized if the first laser beam is a collimated laser beam or a parallel beam.

The second surface region of the reflecting optical element can also be embodied as a convexly curved paraboloid surface. In this case, the second surface region typically likewise forms an off-axis segment of a paraboloid, e.g., the principal axis of the paraboloid extends parallel to the incident second laser beam but not through the second surface region. If the incident second laser beam is a parallel beam, aberration-free imaging of the second laser beam can be realized in this manner.

In some implementations, the second surface region includes a convexly curved hyperboloid surface. Aberration-free imaging of a divergent laser beam incident on the second surface region can be realized with the aid of a curved hyperboloid surface. Typically, the hyperboloid surface is likewise an off-axis segment of a rotation hyperboloid, e.g., the second surface region does not contain the axis of rotation or the principal axis of the hyperboloid but extends parallel to the principal axis.

The use of a second laser beam which is incident in a divergent manner on the second surface region was found to be advantageous if the first, inner surface region has a comparatively large numerical aperture since, in this case, the concentrically arranged ring-shaped second surface region is even larger, and so, when a collimated second laser beam is used, the optical elements arranged in the beam path upstream of the superposition apparatus would have to have correspondingly large dimensions, in particular the optical element through which the second laser beam enters into the vacuum chamber. Alternatively, there could also be parallel expansion within the vacuum chamber itself for the purposes of generating a ring-shaped beam cross section, to which end, however, the use of comparatively large optical elements would likewise be necessary.

If the second laser beam is a convergent laser beam, the second surface region for realizing aberration-free imaging can be embodied as a convexly curved ellipsoid surface. In this case too, the second surface region typically forms an off-axis segment of the ellipsoid, e.g., neither the semi-major axis nor the semi-minor axis of the ellipsoid extends through the second surface region. Depending on whether the first laser beam is incident on the first surface region in a convergent, divergent or collimated manner, said first surface region can be embodied as a convex ellipsoid surface, a hyperboloid surface or as a paraboloid surface, respectively.

Some implementations include a focusing optical element, arranged in the beam path downstream of the reflecting optical element. The focusing optical element is configured to focus the first and the second laser beam in the target region. Both laser beams pass through, or are reflected by, the focusing optical element (typically a focusing mirror) together such that temperature-dependent fluctuations or thermally dependent displacements of the focusing optical element have the same effect on both laser beams, and therefore there is no influence on the relative distance between the two focal positions due to such fluctuations.

In some implementations, the focusing optical element has at least one concavely curved, reflecting ellipsoid surface. In particular, the focusing optical element can be an ellipsoid mirror with a single reflecting surface forming an off-axis segment of an ellipsoid. In this case, the reflecting ellipsoid surface can be provided with in each case different coatings that are optimized for the reflection of the respective wavelength in the two portions, in which the first and second laser beams are, respectively, incident. The ellipsoid mirror serves for focusing the two laser beams at a respective focal position within the target region, which substantially corresponds to an exit-side focus of the ellipsoid mirror.

In some implementations, the focusing optical element has a first focusing surface region for reflecting the first laser beam and a second focusing surface region, surrounding the first surface region, for reflecting the second laser beam. In particular, the first surface region of the focusing optical element can be a concavely curved ellipsoid surface. The second, concavely curved surface region of the focusing optical element can also be embodied as a reflecting ellipsoid surface.

In some implementations, the first focusing surface region has a first concavely curved ellipsoid surface with a first entrance-side focal length and a first exit-side focal length. The second focusing surface region has a second concavely curved ellipsoid surface with a second entrance-side focal length and a second exit-side focal length. The first and second entrance-side focal lengths are different. The two ellipsoid surfaces have different entrance-side focal lengths, e.g., different entrance-side focal positions. This is advantageous for avoiding illumination or imaging of the transition zone, which exists between the first and the second surface region of the optical element forming the superposition apparatus, and therefore for preventing diffraction effects. The principal axes of the two ellipsoid surfaces and hence the entrance-side focal points lie on a common line. Is was found to be advantageous if the entrance-side focal length of the second, outer ellipsoid surface is greater than the entrance-side focal length of the first, inner ellipsoid surface.

In some implementations, the first and second exit-side focal lengths are the same, for e.g., the two laser beams deflected at the first and the second surface region, respectively, are focused at the same distance from the ellipsoid mirror.

In some implementations, the entrance-side focal length of the first concavely curved ellipsoid surface and the exit-side focal length of the first concavely curved ellipsoid surface have the same magnitude. Since the concavely curved ellipsoid surface is comparatively large in the present application, the entrance-side and exit-side focal lengths of the inner ellipsoid surface should have the same magnitude as an imbalance in the production of the mirror could otherwise drastically restrict the achievable accuracy. Even in the case where the focusing mirror only has a single ellipsoid surface, the entrance-side and the exit-side focal lengths should therefore correspond.

Some implementations include a deflection mirror arranged in the beam path downstream of the focusing optical element to deflect the first and second laser beams in the direction of the target region. The deflection mirror typically has a plane mirror surface and serves as a folding mirror in order to reduce the required installation space within the vacuum chamber. In order to maintain the relative distance between the focal positions of the two laser beams accurately within the target region, it is typically necessary for both laser beams to be incident on the deflection mirror in parallel, for example, aligned along a common beam direction, which is made possible by the superposition described herein.

In some implementations, the deflection mirror is configured to be tiltable, so that, upon tilting the deflection mirror, a first focal position of the first laser beam and a second focal position of the second laser beam are changed. For e.g., the deflection mirror can be tilted, for example, by a motor-driven drive. By tilting the deflection mirror, it is possible to displace or update the focal position of the main pulse in a direction perpendicular to the movement direction of the target material (for example, the target material can move in the direction of the gravitational force or another direction, e.g., a substantially horizontal direction, which, proceeding from the exit of the target material from a provision apparatus, corresponds to a projectile trajectory) to obtain an ideal plasma yield when irradiating the target material.

Without the use of the superposition apparatus, the first and second laser beams would be guided along separate beam paths within the vacuum chamber, and so, for maintaining a constant relative distance between the two focal positions in the case of such updating, a further motor-driven mirror would be required for updating the focal position of the second laser beam in accordance with the focal position of the first laser beam, or vice versa. When using the superposition apparatus described herein, it is possible to realize an incidence of the two laser beams on the deflection mirror with an identical beam direction and it is therefore possible to change the focal positions of the first and second laser beams in the same manner by a single motor-driven deflection mirror, and so it is possible to dispense with a further motor-driven deflection mirror.

Some implementations include a beam shaping apparatus arranged upstream of the superposition apparatus in the beam path of the second laser beam. The beam shaping apparatus is configured to set a ring-shaped beam profile of the second laser beam. Such a beam shaping apparatus is advantageous for adapting the beam profile of the second laser beam to the ring-shaped geometry of the second surface region and therefore for being able to reflect the second laser beam at the ring-shaped outer surface region with a loss of radiation power that is as small as possible.

In some implementations, the beam shaping apparatus comprises at least one conical surface. For e.g., the beam shaping apparatus is embodied in the style of an axicon. The conical surface of the axicon can be embodied as reflecting surface; however, it is also possible to use a transmissive optical element with a conical surface as an axicon for the beam expansion.

In some implementations, the beam shaping apparatus is configured to expand the second laser beam. For e.g., for shaping a divergent second laser beam. Shaping a divergent second laser beam is advantageous, in particular, if the optical element, for example, mirror, serving as a superposition apparatus already has a large entrance-side numerical aperture. In this case, if a ring-shaped collimated second laser beam is used, the beam shaping apparatus and the window in the vacuum chamber for the entry of the second laser beam must have correspondingly large dimensions or possibly, for forming a ring-shaped beam profile, there would have to be a parallel expansion within the vacuum chamber with comparatively large optical elements upstream of the expansion mirror. When realizing a sufficiently large distance between the beam shaping apparatus and the mirror serving as a superposition apparatus, the upstream elements, e.g., the beam shaping apparatus and the window, can have substantially smaller dimensions when the divergent second laser beam is used.

In some implementations, the beam guiding apparatus comprises a ring-shaped encircling mirror surface to deflect the laser beam expanded in the radial direction by the conical surface such that the exiting laser beam with a ring-shaped beam cross-section extends substantially coaxially or parallel with the beam direction of the laser beam (with a circular beam cross section) entering the beam shaping apparatus. By way of example, the ring-shaped encircling mirror surface can be a plane surface which, depending on the alignment thereof in respect of the conical surface, generates a ring-shaped laser beam emerging in a convergent, divergent or collimated manner. The mirror surface can be formed as a deflection mirror that is not transparent to the second laser beam; however, this can also be a mirrored surface which is attached to a main body made of material transmissive to the second laser beam.

In some implementations, the ring-shaped encircling mirror surface forms a convexly curved paraboloid surface or a plane surface. With the aid of a convexly curved encircling mirror surface, it is possible to generate an emerging laser beam with a divergent ring-shaped beam profile, in which the marginal rays of the divergent beam profile lying radially on the inside and on the outside do not extend parallel to one another but rather include an angle there between, e.g., diverge.

Some implementations include a first optical element that closes off the first opening of the vacuum chamber in a gas-tight manner and transmits the first laser beam and a second optical element that closes off the second opening of the vacuum chamber in a gas-tight manner and transmits the second laser beam. As a matter of principle, in addition to the transmitting function thereof, the optical elements at the first and second openings can also satisfy other optical functions, such as, e.g., a collimating or focusing function for the laser beams passing through. By contrast, a transmitting optical element embodied as a window, e.g., as a plane-parallel plate, has no beam-shaping function.

An antireflection coating for the transmitted first or second laser beam can be applied at a surface facing away from the vacuum chamber and/or at a surface arranged in the vacuum chamber of the respective optical element. In this way, there are no, or hardly any, reflections at the surfaces of the transmitting optical element, and so the laser beams are transmitted completely or virtually completely. Losses and scattering are therefore reduced in an advantageous manner or, ideally, completely avoided.

Some implementations include a closed-loop control apparatus configured to regulate at least one of a first focal position of the first laser beam and a second focal position of the second laser beam to a setpoint focal position. Some implementations include an open-loop control apparatus configured to regulate at least one of a first focal position of the first laser beam and a second focal position of the second laser beam to a setpoint focal position. The open-loop and closed-loop control apparatus can regulate at least one focal position of one of the two laser beams to a setpoint focal position for the possibly required adaptation of the distance between the two focal positions. For closed-loop control purposes, the beam paths of the laser beams can be measured using suitable measurement apparatuses. For influencing the focal positions, the closed-loop control apparatus can be connected in a signaling manner with, for example, a focus adjustment apparatus, with actuators of a focus adjustment apparatus, by which the beam directions of the laser beams can be influenced, and with actuators of a focusing apparatus for the individual laser beams, for example, for displacing focusing elements provided therein, such as lenses provided there. The open-loop and/or closed-loop control apparatus also serves to synchronize the beam sources generating the laser beams with the provision apparatus for the target material.

In some implementations, the first laser beam has a wavelength greater than 10 µm. For the purposes of generating a wavelength of more than 10 µm, a $CO_2$ laser is generally used as laser source or driver laser. On account of its long wavelength of approximately 10.6 µm, $CO_2$ laser radiation is also reflected by optical elements which have a comparatively rough optical surface, which may be caused by tin deposits that may arise when tin is used as a target material. The use of a laser source or a driver laser in the form of a $CO_2$ laser, moreover, enables a high conversion efficiency between the input power of the driver laser and the output power of the generated EUV radiation in the case of tin as a target material, provided the $CO_2$ laser is used for generating the main pulse.

In some implementations, the second laser beam has a wavelength less than 3 µm. In general, a solid-state laser, for example an Nd:YAG laser with a wavelength of 1.06 µm, which is typically operated as a short pulse laser, e.g., with pulse lengths in the nanosecond range or in the picosecond range, is used to generate a wavelength of less than 3 µm. It is understood that solid-state lasers or other lasers, which generate wavelengths of less than 3 µm, can also be used as a beam source for generating the pre-pulse. The use of laser radiation with a comparatively short wavelength was found to be advantageous for generating the pre-pulse since this renders it possible to realize very short pulse durations and sharper focusing of the pre-pulse in the target region.

In one implementation, an EUV radiation generating device includes a first beam source and a second beam source operable to generate a first laser beam and a second laser beam, respectively. The EUV radiation generating device also includes a beam guiding apparatus. The beam guiding apparatus includes a vacuum chamber that includes a target region arranged to receive a target material for generating EUV radiation. The vacuum chamber further includes a first opening for receiving into the vacuum chamber a first laser beam and a second opening for receiving into the vacuum chamber a second laser beam. The vacuum chamber also includes a superposition apparatus arranged to superpose the first laser beam having a first wavelength and a second laser beam having a second wavelength for common beam guidance in the direction of the target region. The first laser beam and the second laser beam have different wavelengths. The EUV radiation generating device makes use of the same advantages as the beam guiding apparatus described herein.

The second beam source can be, for example, a solid-state laser (optionally with suitable gain stages) serving to generate the pre-pulse, while the first beam source can be a $CO_2$ laser source (optionally with suitable gain stages) for generating the main pulse. A desired setpoint focal position of the corresponding laser beam can be regulated or set within the target region by the open-loop and/or closed-loop control apparatus. Such closed-loop control is advantageous if interference occurs on the radiation source side or at other optical components, e.g., at the windows, leading to a change in the focal position. By way of example, the closed-loop control apparatus can remove by closed-loop control or suppress interference in the form of variations in the direction or divergence of the laser beam (e.g., a drift) such that the two laser beams, or the focal positions thereof, remain at their respective setpoint focal position by readjustment.

The features mentioned above and the features yet to be explained below can be used on their own in each case or several of these can be used in any combination. The shown and described implementations should not be understood as a conclusive list but instead have an exemplary character for explaining the invention.

The details of one or more implementations of the subject matter of this disclosure are set forth in the accompanying drawings and the description below. Other features, aspects, and advantages of the subject matter will become apparent from the description, the drawings and the claims.

DETAILED DESCRIPTION

Figure 1:
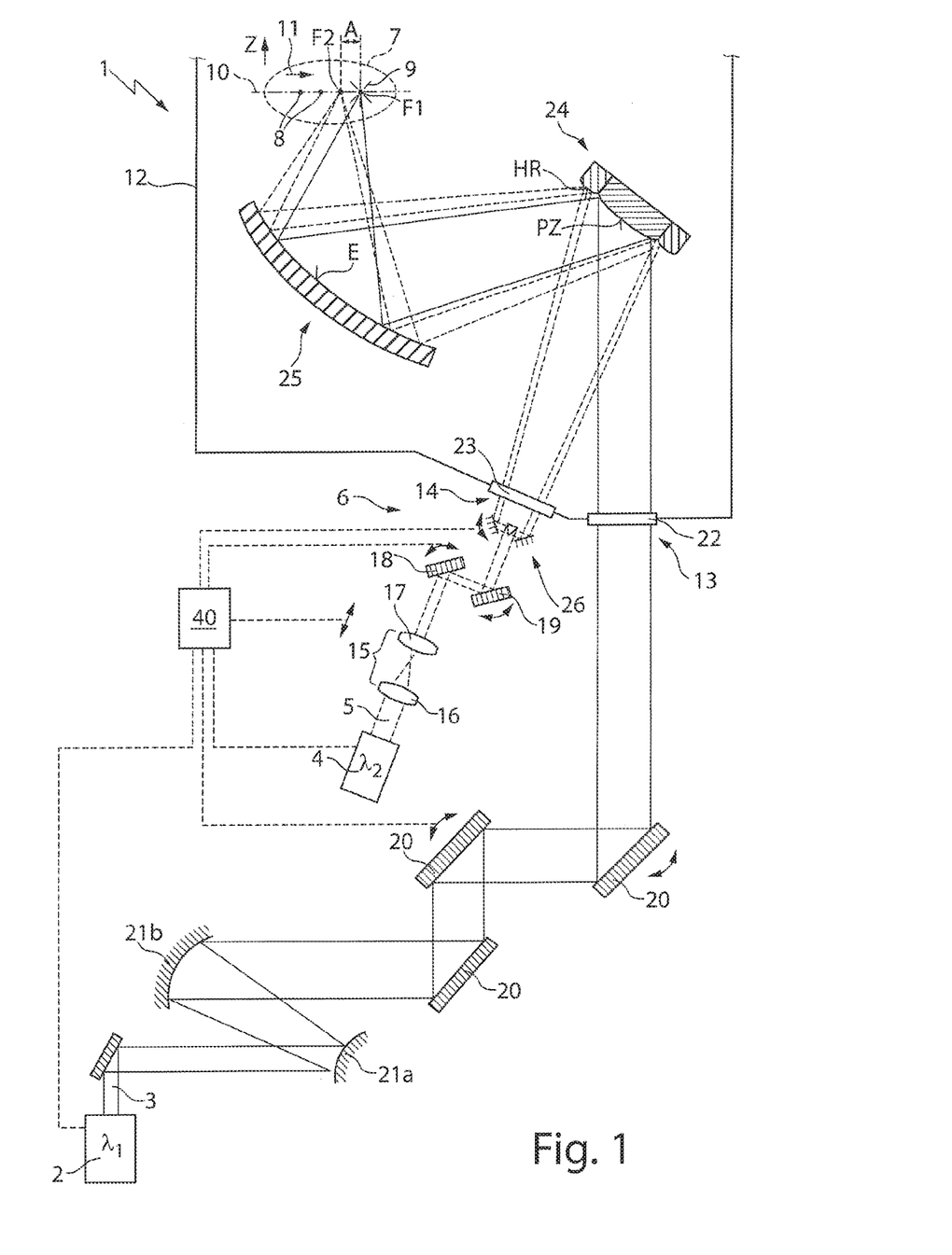
FIG. 1 is a schematic that illustrates an exemplary embodiment of an EUV radiation generating device with a superposition apparatus.

FIG. 1 shows an embodiment of an EUV radiation generating device 1 with a first beam source 2 that serves as a driver laser (for example, a $CO_2$ laser), which generates a first pulsed laser beam 3 with high radiation power (>>1 kW), and a second beam source 4 (for example, a solid-state laser), which generates a second pulsed laser beam 5. For the purposes of generating the first laser beam 3 with a high beam power, the first beam source 2 can include multiple amplifiers. In the shown example, the first laser beam 3 and the second laser beam 5 have substantially different wavelengths $\lambda_1$, $\lambda_2$, respectively. The wavelengths $\lambda_1$ and $\lambda_2$ may differ, for example, by approximately one order of magnitude. It is understood that the difference between the two wavelengths $\lambda_1$, $\lambda_2$ can also be smaller or, where necessary, larger.

In the shown example, the second laser beam 5 has a wavelength $\lambda_2$, for example, approximately 1.06 µm, which is generated by the second beam source 4. The second beam source 4 can, for example, be a solid-state laser in the form of an Nd:YAG laser, e.g. a disk laser, in ultrashort pulsed operation, e.g., with pulse rates in the nanosecond range or in the picosecond range. The first laser beam 3, generated by a first beam source 2, has a wavelength $\lambda_1$, for example, approximately 10.6 µm. The first beam source 2 can, for example, be a $CO_2$ laser. The EUV radiation generating device 1 furthermore includes a beam guiding apparatus 6, by which the two laser beams 3, 5 are guided in the direction of a target region 7, in which a target material 8 (for example, tin droplets) has been introduced in order to generate EUV radiation 9. For reasons of clarity, the illustration of measurement apparatuses for monitoring the beam path of the laser beams 3, 5 has been dispensed with. The target material 8, for example, the tin droplets, can be generated by a provision apparatus (not shown here) and the said target material moves along a predetermined trajectory/path 10. The predetermined path 10, which can, for example, correspond to a substantially horizontal, straight lined trajectory in the style of a projectile trajectory, along a horizontal movement direction 11. The movement direction 11 can also correspond to a different direction, e.g. the direction of the gravitational force.

For the purposes of generating the EUV radiation 9, the target material 8 is initially influenced, e.g., heated, expanded, vaporized, ionized and/or brought into the state of a weak or optionally strong plasma, by the second laser beam 5, which forms a pre-pulse. The first laser beam 3, which forms a main pulse, the majority of the target material 8 influenced by the second laser beam 5 is converted into the plasma state and the EUV radiation 9 is generated in the process. The first laser beam 3 can have higher power than the second laser beam 5. It is desirable that the first and the second laser beams 3, 5 impinge on the target 8 (for example, tin droplets that are moving along the predetermined path 10) with a predetermined time interval. This can be achieved, for example, by having the first and the second laser beams to be focused at different spatial points or at different focal positions F1, F2 along the trajectory 10 of the target 8, as shown in FIG. 1.

For the purposes of the targeted alignment or focusing of the EUV radiation 9 generated in this way, the EUV radiation generating device 1 can include an EUV focusing mirror (not shown here). The target material 8, the EUV focusing mirror and the target region 7, into which the target material 8 is introduced, are arranged in a vacuum chamber 12 of the beam guiding apparatus 6. The two beam sources 2, 4 for generating the first and the second laser beams 3, 5 are arranged outside of the vacuum chamber 12, typically in a common housing, or in two separate housings, which are not depicted in FIG. 1.

To guide the first and the second laser beam 3, 5 into the target region 7, the two laser beams 3, 5 are guided into the vacuum chamber 12 via a first opening 13 and via a second opening 14, respectively, proceeding from the respective beam sources 2, 4. To guide the first laser beam 3 from the beam source 2 to the first opening 13, the beam guidance apparatus 6 has multiple deflection mirrors 20 and a pair of parabolic mirrors 21a, 21b. The parabolic mirrors 21a, 21b can change the beam cross section of the first laser beam 3.

For guiding the second laser beam 5 to the second opening 14, the beam guiding apparatus 6 includes a telescopic arrangement 15 that can change the cross section of the second laser beam 5. The telescopic arrangement 15 has a focusing lens 16 and a collimating lens 17 downstream thereof in the beam path. Two deflection mirrors 18, 19 which deflect the second laser beam 5 to the second opening 14 are arranged in the beam path of the second laser beam 5 downstream of the telescopic arrangement 15.

Mounted in the region of the first opening 13 is an optical element 22 which closes off the first opening 13 of the vacuum chamber 12 in a gas-tight manner and transmits the first laser beam 3, said optical element 22 being embodied as a window or as a thin plane-parallel plate in the shown example. Accordingly, in the example shown in FIG. 1, an optical element 23 which closes off the second opening 14 of the vacuum chamber 12 in a gas-tight manner and transmits the second laser beam 5 is mounted on said second opening.

The first window 22 at the first opening 13 is substantially transparent to the first laser beam 3 and can be formed from, for example, (artificially manufactured) diamonds, as this material, on account of the high thermal conductivity thereof, can effectively dissipate the heat introduced by the high laser power (>>1 kW) of the first laser beam 3. The second window 23 at the second opening 14 is substantially transparent to the second laser beam 5, in particular to wavelengths of less than 3 µm, and it can be formed, for example, from a fused quartz glass material.

The two windows 22, 23 have an antireflection coating for the transmitted first and second laser beams 3, 5, respectively, at the surfaces facing away from the vacuum chamber 12 and at the surfaces arranged in the vacuum chamber 12 for the purposes of minimizing power losses caused by reflection during the passage into the vacuum chamber 12.

In some implementations, it may be advantageous, despite the use of antireflection coatings, for both the first window 22 and the second window 23 to be aligned at an angle that differs from 90° with respect to the beam direction of the first and second laser beams 3, 5, respectively, in order to be able to use the radiation of the first and second laser beams 3, 5, reflected back at the respective window 22, 23, for measurement purposes.

The supply of the two laser beams 3, 5 through separate openings 13, 14 is advantageous since, in this manner, the material of the windows 22, 23 can be matched to the transmitted wavelengths $\lambda_1$, $\lambda_2$ of the first and second laser beams 3, 5, respectively, and it is thereby possible to avoid power losses or losses in the beam quality when passing through the windows 22, 23.

In order to combine the beam paths of the first and second laser beams 3, 5 after entrance into the vacuum chamber 12, the beam guiding apparatus 6 has a superposition apparatus 24. In the example shown in FIG. 1, the superposition apparatus is formed by a beam-expanding mirror 24, which, together with an ellipsoid mirror 25 downstream thereof in the beam path, forms a common focusing unit for focusing the first and second laser beams 3, 5 at the first focal position F1 and at the second focal position F2, respectively, within the target region 7.

Figure 2:
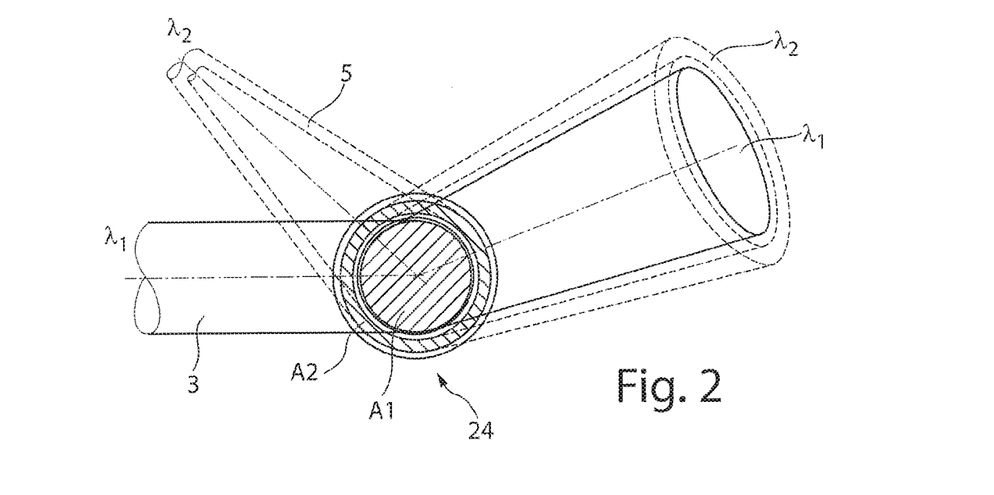
FIG. 2 is a schematic that illustrates a view of a mirror from FIG. 1 with a first, inner surface region for reflecting the first laser beam and a second surface region, surrounding the first surface region.

As shown in FIG. 2, the expansion mirror 24 has a first surface region A1, which is circular in the shown example, and a second annular surface region A2 that surrounds the first surface region. The first laser beam 3 with a circular cross section is incident on the first surface region A1 and it is expanded on the convexly curved paraboloid surface PZ (cf. FIG. 1) of the first surface region A1. Prior to incidence on the second surface region A2, the second laser beam 5 passes through a beam shaping apparatus 26, which is embodied to reshape the beam cross section of the second laser beam 5 from a circular beam cross section into a ring-shaped beam cross section. In order to let the second laser beam 5 be incident centrally on the beam shaping apparatus 26, more precisely on a conical surface provided there, the two deflection mirrors 18, 19 can be tilted in a motor-driven manner with the aid of actuators, as indicated in FIG. 1 by double-headed arrows.

The beam shaping apparatus 26 also serves to expand the second laser beam 5 such that the latter is incident in a divergent manner on the second surface region A2, as can be easily identified in FIG. 2. The second laser beam 5 is expanded at the convexly curved hyperboloid surface HR (cf. FIG. 1) of the ring-shaped/annular second surface region A2 of the beam-expanding mirror 24.

The first laser beam 3 incident in a collimated fashion on the parabolically curved first surface region A1 is reflected in an aberration-free manner at the paraboloid surface PZ because the said laser beam 3 extends substantially parallel to an axis of symmetry (not shown here) of the paraboloid surface PZ. The second laser beam 5 incident in a divergent manner on the hyperboloid surface HR is also reflected in an aberration-free manner since said laser beam is incident on the latter in a manner substantially parallel to an axis of symmetry (not shown here) of the hyperboloid surface HR. The surface geometry of the respective surface region A1, A2 depends on whether the respective laser beam is incident thereon in a convergent, collimated or divergent manner. Therefore, if one of the two laser beams 3, 5 is incident on the respective surface region A1, A2 in a focused or convergent manner—unlike what is depicted in the example shown here—an ellipsoid surface is advantageous for generating an aberration-free reflection or aberration-free imaging.

Both laser beams 3, 5 leave the expansion mirror 24, which serves as a superposition apparatus, in a manner concentric with one another, e.g., said laser beams extend along a common beam direction and they are incident on the ellipsoid mirror 25 downstream thereof in the beam path. For the purposes of the effect as pre-pulse and as a main pulse, it is necessary for the laser beams 3, 5 focused by the ellipsoid mirror 25 to be focused at different focal positions F1, F2, arranged at a predetermined distance A from one another, within the target region 7 since a time offset between the incidence of the two pulsed laser beams 3, 5 on one and the same tin droplet 8 can only be realized in this manner. The tin droplet 8, which is impinged upon by a pulse (pre-pulse) of the second laser beam 5 at the second focal position F2 is, in this case, subsequently impinged upon by a pulse (main pulse) of the first laser beam 3 at the first focal position F1.

It is desirable to select the distance A between the two focal positions F1, F2 along the movement direction 11 of the tin droplets in such a way that the time-of-flight of a respective tin droplet 8 between the two focal positions F1, F2 corresponds to the time offset between the two laser pulses of the beam sources 2, 4. To impinge upon all tin droplets 8 in the manner described above, the distance between two adjacent tin droplets 8 should also be an integer multiple of the distance A between the two focal positions F1, F2 in the direction 11 of the trajectory 10 of the tin droplets 8.

The distance A between the two focal positions F1, F2 can be adjusted by a focus adjustment apparatus which, in the shown example, serves to influence the beam direction of the second laser beam 5. In the shown example, the focus adjustment apparatus includes two deflection mirrors 20, which can be tilted (for example, by actuators) in the beam path of the first laser beam 3. The deflection mirrors render it possible to vary or adjust the beam direction of the first laser beam 3 and hence the region of incidence at the expansion mirror 24. As result of a (slight) oblique incidence of the first laser beam 3 generated by the deflection mirrors 20, the first laser beam is focused at a focal position F1 which is spaced apart from the focal position F2 of the second laser beam 5 by the value A.

Hence, the focal position F1 of the first laser beam 3 can be changed along the movement direction 11 of the target material 8 by tilting the deflection mirrors 20 about respectively suitable tilt angles. In this manner, it is also possible to adjust the distance A between the two focal positions F1, F2 along the movement direction 11 of the target material. Alternatively or additionally, it is also possible to provide in the beam guiding apparatus 6 a focus adjustment apparatus for adjusting the focal position F2 of the second laser beam 5 along the movement direction 11 of the target material 8, for example, by tilting the beam shaping apparatus 26 in a motor-driven manner by way of a suitable actuator, as shown in FIG. 1, or by virtue of use being made of further tiltable deflection mirrors (not shown here), arranged in the beam path downstream of the beam shaping apparatus 26, for adjusting the focus.

In order to make the focal position F2 of the second laser beam 5 adjustable not only along the movement direction 11 of the target material 8 but also in a direction perpendicular thereto (Z-direction, cf. FIG. 1), it is possible to use the telescopic arrangement 15 as a focusing apparatus. In a basic setting, the two lenses 16, 17 of the telescopic arrangement 15 are arranged with the spacing of the focal lengths thereof such that the collimated second laser beam 5 entering into the telescopic arrangement 15 leaves the telescopic arrangement 15 in a collimated manner (and in a manner magnified or reduced by the desired imaging scale).

In the shown example, the second lens 17 of the beam telescope 15, which acts as a collimation lens, is displaceable along or counter to the beam direction of the second laser beam 5 by a suitable motor-driven drive. By displacing the collimating lens 17 out of the basic setting that results in a collimated beam 5, a divergent beam or a convergent beam can be formed from the collimated second laser beam 5 entering the beam telescope 15, depending on whether the second lens 17 is displaced along or counter to the beam direction of the second laser beam 5. If the second laser beam 5 enters into the beam telescope 15 in a divergent or convergent manner, the focal position F2 of the second laser beam 5 changes in the Z-direction, and so the target material 8 at different positions in the Z-direction can be impinged upon by the second laser beam 5.

Figure 3:
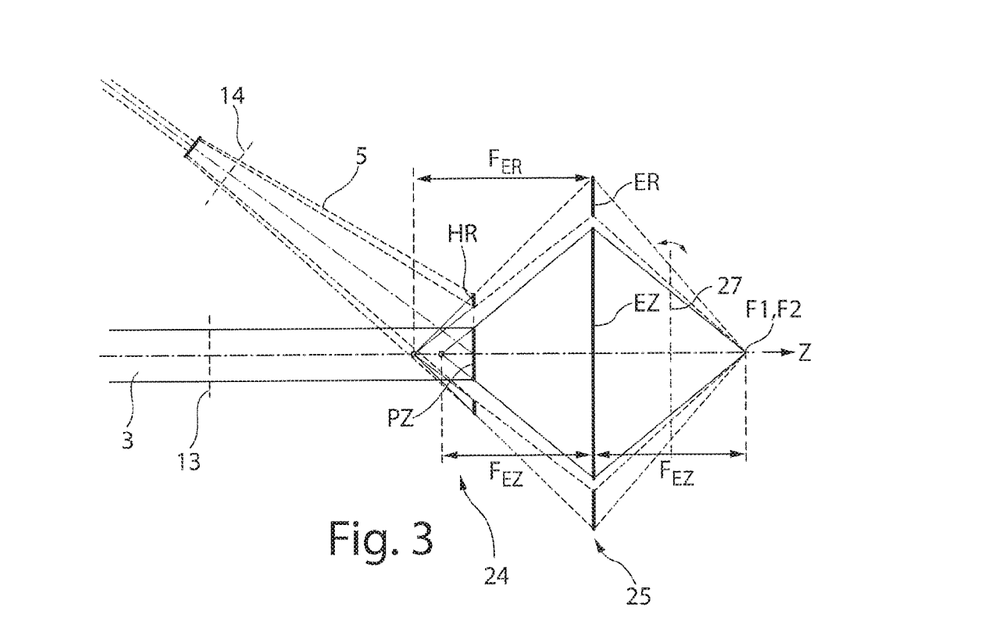
FIG. 3 is a schematic that illustrates a beam path in the vacuum chamber of FIG. 1 with an ellipsoid mirror, downstream of the expansion mirror in the beam path, with two different entrance-side focal lengths.

Deviating from the illustration shown in FIG. 1, in which an ellipsoid mirror 25 is used with a single concavely curved ellipsoid surface E for focusing the two laser beams 3, 5, FIG. 3 shows an ellipsoid mirror 25, which has a first, inner concavely curved ellipsoid surface EZ and a second, outer, likewise concavely curved ellipsoid surface ER, which are arranged as shown in FIG. 2, e.g., as concentric surface regions A1, A2. The expansion mirror 24 forming the superposition apparatus and the ellipsoid mirror 25 are depicted by vertical lines in FIG. 3, in which vertical lines represent the mirror positions at which the laser beams 3, 5 are expanded and focused. As is possible to identify in FIG. 3, the exit-side focal lengths of the two ellipsoid surfaces EZ, ER coincide, and so the two focal positions F1, F2 coincide in the Z-direction, e.g., perpendicular to the movement direction 11 of the target material 8.

Depicted in a dashed manner in FIG. 3 is a deflection mirror 27 with a plane mirror surface which serves to fold the beam or to deflect the first and second laser beams 3, 5 in the direction of the target region 7. The deflection mirror 27 is tiltable, for example, by a motor-driven drive, as indicated in FIG. 3 by a double-headed arrow. If the two laser beams 3, 5 are incident on the deflection mirror 27 in parallel or with a common beam direction, the focal positions F1, F2 of the two laser beams 3, 5 can be displaced together in the Z-direction, e.g., perpendicular to the movement direction 11 of the target material 8, without the distance A between the two focal positions F1, F2 changing in the process. Displacing the focal positions F1, F2 of the two laser beams 3, 5 in the Z-direction serves to optimize the plasma yield and hence to maximize the radiation power generated by the EUV radiation generating device 1.

The entrance-side focal length $F_{EZ}$ of the first, inner ellipsoid surface EZ has approximately the same magnitude as the exit-side focal length $F_{EZ}$ thereof in order to avoid the occurrence of imbalances when producing the ellipsoid mirror 25. However, the entrance-side focal length $F_{ER}$ of the outer ellipsoid surface ER does not correspond to the entrance-side focal length $F_{EZ}$ of the inner ellipsoid surface EZ but, instead, it is greater in the shown example ($F_{ER} > F_{EZ}$), as a result of which the area or the dimension of the outer ellipsoid surface ER can be reduced. The selection of different entrance-side focal lengths $F_{ER}$, $F_{EZ}$ for the two ellipsoid surfaces ER, EZ was found to be advantageous to eliminate diffraction effects, caused at the transition between the two surface regions A1, A2 of the expansion mirror 24, when focusing on the target region 7.

Figure 4:
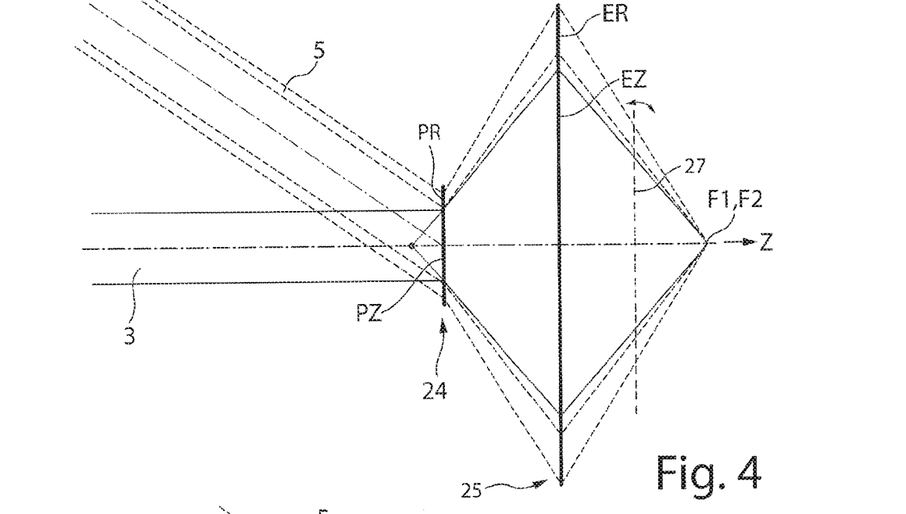
FIG. 4 is a schematic that illustrates a beam path in which the second laser beam is incident in a collimated manner on an expansion mirror and with an ellipsoid mirror, downstream thereof in the beam path, with a single entrance-side focal length.

FIG. 4 shows a configuration of the expansion mirror 24 and of the focusing mirror 25. The second laser beam 5 is incident in a collimated manner on the first expansion mirror 24. In this case, the second, outer surface region A2 has a convex paraboloid surface PR in order to realize aberration-free imaging. The outer paraboloid surface PR in this case forms a segment of a paraboloid, the principal axis or axis of symmetry thereof extending parallel to the incident second laser beam 5. In the configuration shown in FIG. 4, the entrance-side and exit-side focal lengths of the ellipsoid mirror 25 coincide, e.g., the inner ellipsoid surface EZ and the outer ellipsoid surface ER depicted in FIG. 4 are portions of one and the same ellipsoid surface, as shown in FIG. 1. The inner portion EZ of the ellipsoid surface and the outer portion ER of the ellipsoid surface can be provided with different coatings, which are optimized for reflecting the first and the second wavelength $\lambda_1$, $\lambda_2$, respectively.

Figures 5, 6:
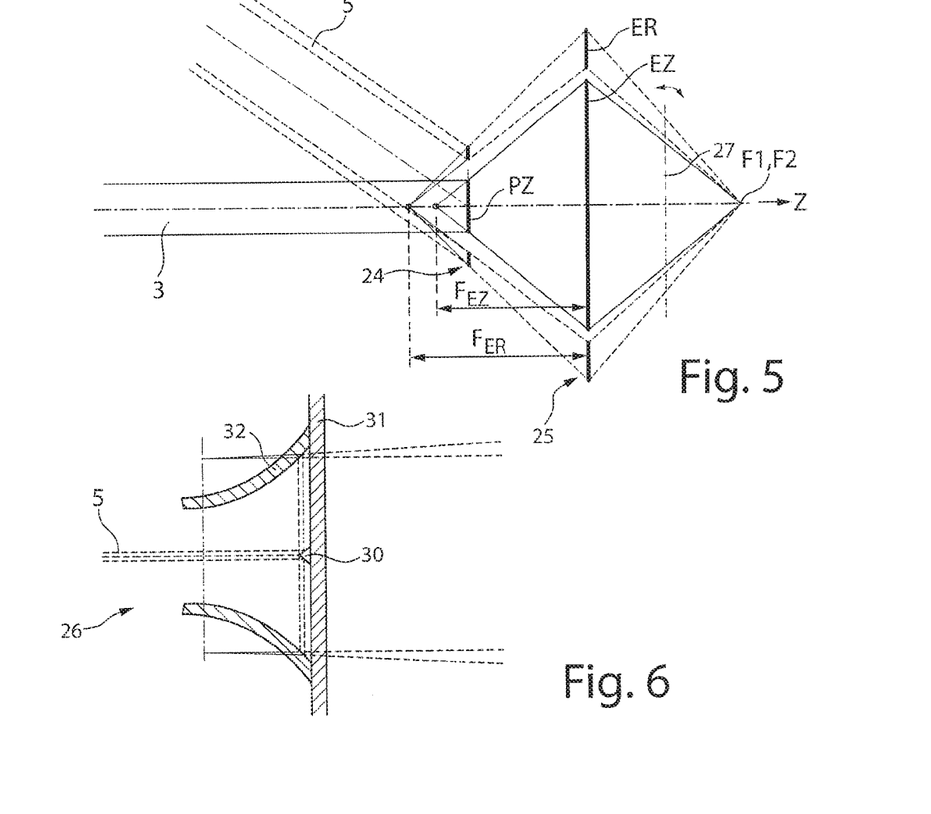
FIG. 5 is a schematic that illustrates a beam path, in which an ellipsoid mirror has two different entrance-side focal lengths.
FIG. 6 is a schematic that illustrates a beam shaping apparatus for forming a second laser beam.

FIG. 5 shows an illustration analogous to FIG. 4, in which the ellipsoid mirror 25, as shown in FIG. 3, has a first, inner concavely curved ellipsoid surface EZ and a second, outer concavely curved ellipsoid surface ER, which, as in FIG. 3, have different entrance-side focal lengths $F_{EZ}$, $F_{ER}$ in order to reduce diffraction losses.

FIG. 6 shows a detailed illustration of the beam shaping apparatus 26 from FIG. 1, which serves to generate a ring-shaped beam cross section in the second laser beam 5. To this end, the beam shaping apparatus 26 has a central conical surface 30 or a cone-shaped optical element, which is attached to a transparent, plate-shaped holder 31. The incident laser beam 5 is deflected by 90° at the conically circumferential reflecting surface 30 and it is incident on a ring-shaped parabolic mirror 32, which can, for example, be fastened to the holder 31. As is shown in FIG. 6, not only is a ring-shaped beam cross section generated at the parabolic mirror 32, but the second laser beam 5 is also expanded, e.g., it has a divergent beam path when leaving the beam shaping apparatus. What is achieved by the parabolically embodied ring-shaped mirror 32 in the shown example is that the marginal ray lying radially at the inside of the expanded second laser beam 5 extends parallel to the beam direction of the incident second laser beam 5 while the marginal ray lying radially at the outside extends at an angle thereto such that the emerging second laser beam 5 is divergent overall.

A plane ring-shaped mirror 32 can also be provided in the beam shaping apparatus 26 instead of the parabolically curved mirror for aligning the emerging second laser beam 5, with the beam axis thereof, parallel to the second laser beam 5 entering into the beam shaping apparatus 26, as indicated in FIG. 1. Here, it is possible to adjust the alignment of the ring-shaped emerging second laser beam 5 by setting the angle at which the ring-shaped mirror 32 is arranged in relation to the beam axis of the second laser beam 5 such that said second laser beam 5 emerges from the beam shaping apparatus 26 in a collimated, divergent or convergent manner. It is understood that this is also possible by the parabolic ring mirror 32, shown in FIG. 6, in the case of a suitable design of the curvature of the reflecting surface.

In order to monitor and control and/or regulate the generation of the EUV radiation 9, the above-described beam guiding apparatus 6 has a monitoring apparatus in the form of an open-loop/closed-loop control apparatus 40, which is embodied or programmed to synchronize the pulse generation by the two beam sources 2, 4 with the provision apparatus (not shown here) for the target material 8. The open-loop/closed-loop control apparatus 40 is also embodied or programmed to influence the beam direction of the first and/or of the second laser beam(s) 3, 5 to undertake a possibly required adjustment of the distance A between the two focal positions F1, F2 along the movement direction 11 of the target material 8 and, to this end, it is connected in a signaling manner with two actuators (or other mechanism to tilt the deflection mirror 20) actuating the tiltable deflection mirrors 20 and, possibly, with actuators of further tiltable deflection mirrors (not shown here) arranged in the beam path of the second laser beam 5 downstream of the beam shaping apparatus 26. The open-loop and closed-loop control apparatus 40 also serves to adjust the actuators of the two deflection mirrors 18, 19 arranged upstream of the beam shaping apparatus 26 to bring about a central incidence and a suitable alignment of the second laser beam 5 on the conical surface 30. Finally, the open-loop and closed-loop control apparatus 40 is also connected to a drive or actuator, indicated by a double-headed arrow, for displacing the second lens 17 of the beam telescope 15 and, possibly, to a drive for displacing the parabolic mirror or one of the parabolic mirrors 21a, 21b in the beam path of the first laser beam 3. In this manner, the open-loop/closed-loop control apparatus 40 renders it possible to keep each one of the two laser beams 3, 5 at the focal position F1, F2 thereof such that said focal positions correspond to a respective setpoint focal position, even in the case of disturbances in the beam guidance, which is caused, for example, by vibrations, by thermal influences or by fluctuations in the beam sources 2, 4.

In the manner described herein, it is possible to realize common focusing of the two laser beams with (significantly) different wavelengths in the common target region in a particularly effective manner, despite the complicated optical, geometrical, e.g., installation space-dependent, and method-dependent and production-dependent boundary conditions which arise.

As an alternative to the above-described superposition of the two laser beams 3 and 5 at the reflecting, beam-expanding optical element 24, a superposition of the two laser beams 3 and 5 in the vacuum chamber 12 can also be realized in a different manner. In some implementations, one of the two windows 22, 23, which close off the vacuum chamber 12 in a gas-tight manner, can be used as a superposition apparatus. For example, an optical surface (surface on which an optical beam impinges) of one of the windows 22 and 23 can be coated with a reflecting coating that reflects the laser beam 5, 3 which is transmitted by the other window 23, 22, while the window 22, 23 transmits (or is transparent to) the laser beam 3 or 5, which passes through that window 22, 23. At the reflecting coating, the laser beam 5, 3 passing through the respective other window 22, 23 is reflected such that the two laser beams 3, 5 are superposed at the window 22, 23 and subsequently propagate along a common beam direction within the vacuum chamber 12.

A number of implementations have been described. Nevertheless, it will be understood that various modifications may be made without departing from the spirit and scope of the invention. Accordingly, other implementations are within the scope of the following claims.

What is claimed is:

1. A beam guiding apparatus, comprising:
a vacuum chamber comprising a target region arranged to receive a target material for generating EUV radiation, wherein the vacuum chamber further comprises a first opening for receiving into the vacuum chamber a first laser beam and a second opening for receiving into the vacuum chamber a second laser beam;
a superposition apparatus arranged to superpose the first laser beam having a first wavelength and a second laser beam having a second wavelength for common beam guidance in the direction of the target region; and
a beam shaping apparatus arranged upstream of the superposition apparatus in the beam path of the second laser beam, wherein the beam shaping apparatus is configured to set a ring-shaped beam profile of the second laser beam,
wherein the first laser beam and the second laser beam have different wavelengths,
wherein the superposition apparatus comprises a reflecting optical element, arranged in the vacuum chamber, the reflecting optical element comprising a) a first surface region for reflecting the first laser beam and b) a second surface region, surrounding the first surface region in a ring-shaped manner, for reflecting the second laser beam, and
wherein the reflecting optical element is configured to expand the first and second laser beams.

2. The beam guiding apparatus of claim 1, wherein the first surface region comprises a convexly curved paraboloid surface.

3. The beam guiding apparatus claim 1, wherein the second surface region comprises a convexly curved hyperboloid surface.

4. The beam guiding apparatus of claim 1, comprising a focusing optical element, arranged in the beam path downstream of the reflecting optical element, wherein the focusing optical element is configured to focus the first and the second laser beam in the target region.

5. The beam guiding apparatus of claim 4, wherein the focusing optical element has at least one concavely curved, reflecting ellipsoid surface.

6. The beam guiding apparatus of claim 4, wherein the focusing optical element has a first focusing surface region for reflecting the first laser beam and a second focusing surface region, surrounding the first surface region, for reflecting the second laser beam.

7. The beam guiding apparatus of claim 4, wherein the first focusing surface region has a first concavely curved ellipsoid surface with a first entrance-side focal length and a first exit-side focal length, and the second focusing surface region has a second concavely curved ellipsoid surface with a second entrance-side focal length and a second exit-side focal length, wherein the first and second entrance-side focal lengths are different.

8. The beam guiding apparatus of claim 7, wherein the first and second exit-side focal lengths are the same.

9. The beam guiding apparatus of claim 7, wherein the entrance-side focal length of the first concavely curved ellipsoid surface and the exit-side focal length of the first concavely curved ellipsoid surface have the same magnitude.

10. The beam guiding apparatus of claim 4, comprising a deflection mirror arranged in the beam path downstream of the focusing optical element to deflect the first and second laser beams in the direction of the target region.

11. The beam guiding apparatus of claim 10, wherein the deflection mirror is configured to be tiltable, so that, upon tilting the deflection minor, a first focal position of the first laser beam and a second focal position of the second laser beam are changed.

12. The beam guiding apparatus of claim 1, wherein the beam shaping apparatus comprises at least one conical surface.

13. The beam guiding apparatus of claim 1, wherein the beam shaping apparatus is configured to expand the second laser beam.

14. The beam guiding apparatus of claim 1, wherein the beam shaping apparatus comprises a ring-shaped encircling mirror surface.

15. The beam guiding apparatus of claim 14, wherein the ring-shaped encircling minor surface forms a convexly curved paraboloid surface or a plane surface.

16. The beam guiding apparatus of claim 14, further comprising a first optical element that closes off the first opening of the vacuum chamber in a gas-tight manner and transmits the first laser beam, and a second optical element that closes off the second opening of the vacuum chamber in a gas-tight manner and transmits the second laser beam.

17. The beam guiding apparatus of claim 14, further comprising: a closed-loop control apparatus configured to regulate at least one of a first focal position of the first laser beam and a second focal position of the second laser beam to a setpoint focal position.

18. The beam guiding apparatus of claim 1, wherein the first laser beam has a wavelength greater than 10 μm.

19. The beam guiding apparatus of claim 1, wherein the second laser beam has a wavelength less than 3 μm.

20. An EUV radiation generating device comprising:
a first beam source and a second beam source operable to generate a first laser beam and a second laser beam, respectively; and
a beam guiding apparatus, comprising:
a vacuum chamber comprising a target region arranged to receive a target material for generating EUV radiation, wherein the vacuum chamber further comprises a first opening for receiving into the vacuum chamber a first laser beam and a second opening for receiving into the vacuum chamber a second laser beam;
a superposition apparatus arranged to superpose the first laser beam having a first wavelength and a second laser beam having a second wavelength for common beam guidance in the direction of the target region; and
a beam shaping apparatus arranged upstream of the superposition apparatus in the beam path of the second laser beam, wherein the beam shaping apparatus is configured to set a ring-shaped beam profile of the second laser beam,
wherein the first laser beam and the second laser beam have different wavelengths,
wherein the superposition apparatus comprises a reflecting optical element, arranged in the vacuum chamber, the reflecting optical element comprising a) a first surface region for reflecting the first laser beam and b) a second surface region, surrounding the first surface region in a ring-shaped manner, for reflecting the second laser beam, and
wherein the reflecting optical element is configured to expand the first and second laser beams.

* * * * *

UNITED STATES PATENT AND TRADEMARK OFFICE
CERTIFICATE OF CORRECTION

PATENT NO. : 9,575,324 B2
APPLICATION NO. : 15/068088
DATED : February 21, 2017
INVENTOR(S) : Martin Lambert Page 1 of 1

It is certified that error appears in the above-identified patent and that said Letters Patent is hereby corrected as shown below:

On the Title Page

Column 2 (Abstract), Line 15, delete "beam," and insert -- beam. --

In the Claims

<u>Column 16</u>
Line 22, in Claim 3, after "apparatus" insert -- of --
Line 59, in Claim 11, delete "minor," and insert -- mirror, --

<u>Column 17</u>
Line 5, in Claim 15, delete "minor" and insert -- mirror --

Signed and Sealed this
Twenty-sixth Day of November, 2019

Andrei Iancu
*Director of the United States Patent and Trademark Office*